United States Patent Office 3,221,245
Patented Nov. 30, 1965

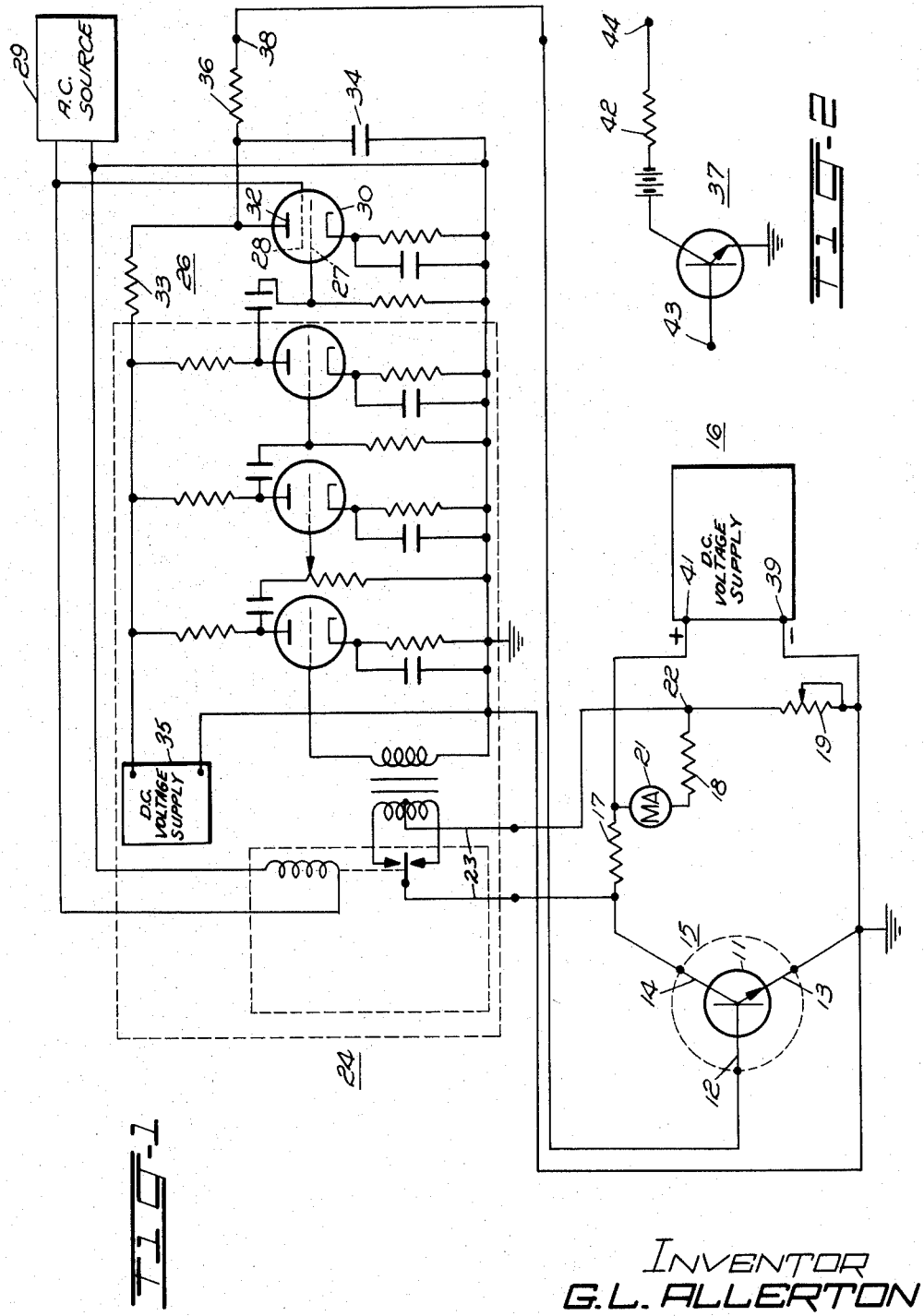

3,221,245
APPARATUS FOR AUTOMATICALLY BIASING
A TRANSISTOR
George L. Allerton, Orefield, Pa., assignor to Western
Electric Company, Incorporated, New York, N.Y., a
corporation of New York
Filed Nov. 1, 1961, Ser. No. 149,360
4 Claims. (Cl. 323—4)

This invention relates generally to apparatus for regulating current and, more particularly, to apparatus for automatically biasing a transistor.

In order to perform testing of certain electrical components it is sometimes necessary to provide a predetermined current flow therein. For example, in the dynamic testing of transistors, it is necessary that they be properly biased. Also, in order that testing of transistors have any practical meaning, it is necessary that transistors of the same type be tested under identical conditions. Accordingly, in any transistor testing apparatus, biasing means which will assure uniformity in test conditions must be provided. Further, because of the variations in transistor characteristics between transistors of the same type, biasing means which are adjustable are required. For laboratory testing of transistors or for the production testing of small quantities of transistors, adjustment of the biasing can be accomplished by manual means; however, for the production testing of large quantities of transistors, manual adjustment proves to be very costly and time consuming. Consequently, it is highly desirable that any transistor testing apparatus used for the production testing of large quantities of transistors have means therein for automatically adjusting the biasing of a transistor under test.

It is, therefore, an object of this invention to provide new and improved apparatus for automatically biasing a transistor.

Another object of this invention is to provide new and improved apparatus for automatically biasing a transistor at predetermined values of collector current and voltage.

With the foregoing and other objects in view, apparatus illustrating certain features of the invention may include a resistor having one end connected to the collector of a transistor. A constant D.C. voltage from a first D.C. voltage source is applied between the other end of the resistor and the transistor emitter to forward bias the base-emitter junction of the transistor and to reverse bias the collector-base junction thereof. Base current for controlling the collector current is supplied to the transistor by coupling the base through an impedance network to a second D.C. voltage source. A variable conductivity device, such as an electron tube, is connected to the impedance network and the second D.C. voltage source in a manner such that when an input signal of one polarity is applied to a control electrode of the tube, the conductivity thereof increases to decrease the base current supplied to the transistor. Conversely, when an input signal of the opposite polarity is applied to the control electrode, the conductivity of the tube decreases to increase the base current supplied to the transistor. A circuit is provided for establishing a reference voltage having a value equal to the potential of the collector when a predetermined value of collector current is flowing. A comparator is provided for comparing the collector voltage to the reference voltage and for generating an output signal having a polarity dependent upon whether the collector voltage is of a higher or lower value than the reference voltage, and having a magnitude dependent upon the difference between the voltages. The output of the comparator is coupled to the control electrode of the tube to vary the conductivity of the tube in accordance with the phase and magnitude of the comparator output. Variation in the conductivity of the tube results in a variation of the base current supplied to the transistor. The base current varies until the collector voltage is equal to the reference voltage, whereupon the transistor is biased at the predetermined values of collector current and voltage.

The invention will be more readily understood from the detailed description which follows when read in conjunction with the drawings wherein:

FIG. 1 is a schematic diagram of an embodiment of the invention for use with NPN transistors, and FIG. 2 is a modification of FIG. 1 for use with PNP transistors.

Referring now to the drawings and in particular to FIG. 1, the circuit shown therein includes a transistor 11 under test mounted in a receptacle 15, having a base electrode 12, an emitter electrode 13 and a collector electrode 14. The transistor 11 is connected in the common emitter configuration with the emitter electrode 13 connected to a point of common potential or ground.

The output of a constant voltage D.C. supply 16 is impressed on the collector 14 of transistor 11 through resistor 17. In parallel with the constant voltage supply 16, is a voltage divider consisting of resistor 18, equal in value to the resistor 17, and variable resistor 19. Resistor 19 is adjusted until the current through resistor 18 reaches the value of current at which it is desired to bias the transistor 11. A milliammeter 21 is provided in series with resistor 18 to measure this current.

Since resistors 17 and 18 are of the same value, if the current through resistor 17 which is also the collector electrode 14 current is equal to the current flow in resistor 18, the collector electrode 14 and point 22 of the voltage divider will be at the same potential. Any departure of the collector current from the desired value will result in a difference of potential between the collector 14 and point 22. An error signal, resulting from any difference of the potential between the collector 14 and point 22, is fed into the input 23 of a conventional chopper amplifier 24. Such amplifiers are well known in the art and further discussion thereof is not warranted. The amplitude of the error signal depends upon the difference in value between the current flowing in the resistors 17 and 18 and the phase depends upon which of the resistors contains the greater current.

The error signal is amplified by the chopper amplifier 24 and impressed on the input of a phase discriminator and regulator unit 26, the unit including a multi-element vacuum tube 30 having a control grid 27 and screen grid 28, the screen grid 28 being connected to a source of A.C. potential 29, which also operates the chopper amplifier 24 in a conventional manner. Thus, conduction of the tube 30 is possible only when the A.C. potential on the screen grid 28 passes through the positive half of its cycle. Further, the phasing between the chopper amplifier 24 and phase discriminator and regulator 26 is such that only when the collector current is greater than the desired value will conduction of tube 30 take place; if the collector current is less in value than the desired value, the tube 30 will be cut-off.

Conduction of the tube 30 reduces the output voltage at the plate 32 which causes a resultant decrease in the current flowing into the transistor base 12 from a D.C. voltage supply 35 which supplies the necessary B+ voltages to the tubes of the chopper amplifier 24 and the phase discriminator and regulating unit 26. This results in a decrease in the collector current and reduces the input 23 to the chopper amplifier 24. This action will continue until the collector current reaches the desired value, at which time the input 23 to the chopper amplifier 24 will be zero and no further action will take place.

The output voltage of a tube is greatest when the tube is cut-off. Therefore, in order to assure proper operation of the circuit, a resistor 36 must be chosen so that when the tube 30 is cut-off the base current into the transistor 11 is such that the collector current is higher than that desired. Thus, when the tube 30 conducts, a decrease in the collector current will result and regulation will proceed in the manner described above.

In order to deliver a D.C. base bias current with a minimum amount of A.C. ripple, a resistor 33 and a capacitor 34 are chosen so that the time constant formed by this combination is long compared to the period of the square wave input to the control grid 27 of the tube 30. This results in a saw tooth wave shape at the plate 32. Further filtering is accomplished by making the capacitor 34 sufficiently large so that the magnitude of the saw tooth wave is small.

As shown, the circuit of FIG. 1, because of the polarities involved, can only be used with NPN transistors. Therefore, for use with PNP transistors, reversal of the biasing polarities of the circuit of FIG. 1 is required. This can be accomplished by breaking the connection between the output terminal 38 and the base electrode 12, and connecting the input 43 of an NPN transistor amplifier 37 of FIG. 2 to the terminal 38 and the output 44 of the transistor amplifier 37 to the base electrode 12 of the transistor under test 11 (which in this instance would be a PNP transistor instead of the NPN transistor shown in FIG. 1). Reversal of the collector electrode 14 is accomplished by reversing the output of the constant voltage supply 16, that is, the negative terminal 39 will be now connected to the collector circuit and the positive terminal 41 made common. Regulation of the collector current is accomplished in the same manner as for the NPN transistor described above, with a resistor 42 serving the same function as resistor 36 in the circuit of FIG. 1.

It is to be understood that the above-described embodiments are merely illustrative of the principles of the invention. Other embodiments may be devised by persons skilled in the art which embody these principles and fall within the spirit and scope thereof.

What is claimed is:

1. Apparatus for biasing a transistor having an emitter, a collector and a base electrode at predetermined values of collector current and voltage, which comprises:
    a two terminal resistor having one of said terminals connected to the collector electrode of the transistor;
    a first D.C. voltage source, said source being regulated and being connected between said emitter electrode and the second terminal of said resistor in a manner such that the emitter-base junction of the transistor is forward biased and the collector-base junction thereof is reverse biased;
    means for establishing a reference voltage having a value equal to the potential at the collector electrode when said predetermined collector current flows through said resistor;
    a second D.C. voltage source having first and second output terminals, said first output terminal being connected to the emitter electrode of said transistor;
    impedance means coupling said base electrode to said second output terminal of said second voltage source whereby a base current for controlling the collector current is supplied to the transistor;
    a variable conductivity device having a control electrode, said variable conductivity device being connected to the impedance means and to the first terminal of said second voltage source in a manner such that when an input signal of one polarity is applied to said control electrode the conductivity of the device increases to decrease the base current supplied to said transistor, and when an input signal of an opposite polarity is applied to said control electrode the conductivity of the device decreases to increase the base current supplied to the transistor;
    means for comparing the collector-voltage to the reference-voltage and for generating an output signal having a polarity dependent upon whether the collector-voltage is of a higher or lower magnitude than the reference-voltage, and having a magnitude dependent upon the difference between said two latter-mentioned voltages; and
    means for coupling the output signal of said comparing and generating means to the control electrode of said variable conductivity device, whereby said collector current and voltage are set to and regulated at the predetermined values thereof.

2. Apparatus in accordance with claim 1 wherein said comparing and generating means comprises:
    a chopper amplifier having first and second input terminals and an output terminal, said first input terminal being connected to the collector electrode, said second input terminal being connected to the reference voltage and said output terminal being connected to the control electrode of said variable conductivity device.

3. Apparatus in accordance with claim 2 wherein an A.C. voltage supply is provided, and wherein said variable conductivity device comprises:
    a multi-element electron tube having an anode, a cathode, a control grid and a screen grid, said anode being connected to the impedance means, said cathode being connected to said second terminal of said second D.C. voltage source, said screen grid being connected to said A.C. voltage source and said control grid being connected to the output terminal of said chopper amplifier, whereby said tube is operable to conduct only upon the simultaneous occurrence of positive polarity signals at said screen and control grids.

4. Apparatus for biasing a transistor having an emitter, a collector and a base electrode at predetermined values of collector current and voltage, which comprises:
    a first two terminal resistor having one of said two terminals connected to the collector of the transistor;
    a first D.C. voltage source having a pair of output terminals, said source being regulated and having its output terminals connected between the emitter electrode and the second terminal of said first resistor in a manner such that the emitter-base junction of the transistor is forward biased and the collector-base junction thereof is reverse biased;
    second and third two terminal resistors, the first terminals of said resistors being connected together, the second terminal of one of said resistors being connected to one of the output terminals of said first voltage source and the second terminal of the other of said resistors being connected to the other of said output terminals of said first voltage source, said second and third resistors having magnitudes such that the voltage at the junction therebetween is equal to the collector voltage when said predetermined collector current flows through said first resistor;
    a second D.C. voltage source having first and second output terminals, said first terminal being connected to the emitter of said transistor;
    fourth and fifth resistors serially coupled to each other and to said base electrode and said second terminal of said second D.C. voltage source, whereby a base current for controlling the collector current is supplied to the transistor;
    an A.C. voltage source;
    a multi-element electron tube having an anode, a cathode, a control grid and a screen grid, said anode being connected intermediate said fourth and fifth resistors, said screen grid being connected to the A.C. voltage source and said cathode being connected to the second terminal of said second D.C. voltage source; and
    a chopper amplifier energized by said A.C. source and having first and second input terminals and an output terminal, said first input terminal being connected to the collector electrode, said second input terminal being connected to the junction of said second and third resistors and said output terminal being connected to the control grid of said tube, whereby when said collector voltage is less than said junction voltage, a signal of positive polarity is applied to said control grid to cause conduction of the tube during the positive half cycle of said A.C. voltage source and thereby reduce the base current supplied to the transistor to reduce the collector current thereof, and when said collector voltage is greater than said junction voltage a signal of negative polarity is applied to said control grid to preclude conduction of said tube and thereby increase the base current supplied to the transistor to increase the collector current thereof.

References Cited by the Examiner
UNITED STATES PATENTS

| | | | |
|---|---|---|---|
| 2,536,245 | 1/1951 | Wills | 323—4 X |
| 2,829,334 | 4/1958 | Murnighan | 323—4 X |
| 2,912,638 | 11/1959 | McNamee | 323—4 X |
| 2,936,413 | 5/1960 | Searcy | 323—22 |
| 2,943,256 | 6/1960 | Parker | 323—22 |
| 2,964,693 | 12/1960 | Ehret | 323—4 |
| 3,025,468 | 3/1962 | Thomas | 324—158 |

LLOYD McCOLLUM, *Primary Examiner.*